Patented Dec. 24, 1935

2,025,538

UNITED STATES PATENT OFFICE 2,025,538

RESINOUS COMPOSITION AND METHOD OF CASTING IT

Roy H. Kienle and Paul F. Schlingman, Schenectady, N. Y., assignors to General Electric Company, a corporation of New York No Drawing. Application January 26, 1933, Serial No. 653,673

6 Claims. (Cl. 18—55)

The present invention relates broadly to resinous compositions and to methods of preparation of the same. It is more particularly directed to the production of resins of the phenol aldehyde type which are acid catalyzed and convertible to the infusible, insoluble state by heat. The invention is also specifically directed to the production of phenolic casting resins which when cured to the infusible, insoluble state are capable of being machined and drilled easily and are capable of taking on a very high polish. Such casting resins, moreover, may be produced in a variety of transparent, translucent and opaque forms varying from white to black.

It has been generally assumed that phenolic resins are heat convertible or heat non-convertible, depending on whether they are respectively alkaline or acid catalyzed. However, recent work of Pollack and Riesenfeld (Z. Angew. Chem. 43, 1129 (1930)) suggested that part of this assumption may not be true. These workers showed that if an acid catalyst were used and the formaldehyde phenol ratio was greater than 1:1,—for example, 7:5, 2:1,—a convertible product resulted. We have found, however, on repeating their investigations and using, as they did, strong acids as catalysts, that convertible resins could be obtained but the reaction products were non-controllable especially as judged from an industrial viewpoint. Furthermore, resins prepared in accordance with the directions of Pollack and Riesenfeld were very brittle and not resistant to light.

After careful investigation we have discovered that the use of alkyd resins as catalysts in the phenol-aldehyde reaction yielded not only an easily controllable reaction but an entirely new series of resins. We found that by carefully controlling the temperature of reaction, the temperature of cure, the phenol-aldehyde ratio and the proportion of alkyd resin catalyst, an easily controllable reaction resulted and products were obtained which exhibited entirely new properties for resins of the phenol-aldehyde type.

The products of our invention, produced by means of the carefully controlled reaction, are light resistant tough, and can be produced in transparent as well as translucent and opaque forms and in various colors. By employing an alkyd resin, we have been able to introduce the characteristics of this resin into the final product and we have been able also to eliminate the use of water-soluble electrolytic catalysts which has resulted in resins of superior electrical qualities.

By reason of the fact that the reaction is easily controlled when the proper amount of alkyd resin catalyst is used, we have invariably been able to produce resins which are fluid up to the gel point and therefore permit almost any shape to be cast therefrom. Furthermore, the resins produced in accordance with our invention are characterized by rapid conversion to the infusible, insoluble state by means of heat, and the cured resin machines easily, drills well, takes on a very high polish thereby enabling the production of a variety of articles for ornamental as well as other purposes. The resins of our invention, moreover, can also be dissolved in solvents while in the soluble state, producing a varnish which has excellent adhesive properties both with respect to metal and wood.

In order that those skilled in the art may fully and adequately practice the invention we will describe the same more in detail, giving first the general conditions which must be observed in carrying out the reaction together with the critical limits of preparation, of reaction catalyst and of temperatures which must be employed, and finally, illustrating the invention by means of specific examples.

In preparing the resins of our invention it has been ascertained that there is a definite limiting temperature which should not be exceeded. This temperature is 130° C. If the temperature should inadvertently materially exceed this limit the reaction becomes non-controllable and the reaction mass may set up in the reaction vessel irrespective of any attempts to stop it or to cool the mass. Furthermore, if the temperature of reaction is above the limit set forth formaldehyde, which is the usual aldehyde employed, escapes, and the resulting resin is weak and readily shows strain cracks on curing.

During the cure process a temperature of not less than 65° C., and preferably 75° to 80° C., should be employed. At the lower temperatures the curing process proceeds too slowly to be of practical value. During the initial curing, relatively high temperatures, for example, 125° C., should not be used as frothing and strains result. However, we have found that if once the initial set has been accomplished relatively high temperatures may be employed thereafter.

The ratio of phenol to aldehyde should always be less than 1 mol to 1 mol, that is, the mol aldehyde content should always be in excess. This condition is important because it is necessary for the production of a heat-convertible rather than a non-heat convertible resin.

The acid value of the alkyd resin catalyst should not appreciably exceed 200 to 210 or the reaction tends to become non-controllable and run away with itself. On the other hand, if the acid value is too low, say, under about 140 to 150, the reaction is too slow and it is difficult to obtain a satisfactory combination between the phenol and aldehyde, that is, it is difficult to obtain a hard, tough, practical product.

The proportion of alkyd resin catalyst employed in the reaction mass is also important. Even though the molecular weight of the alkyd resin molecule is high as compared with the phenol resin molecule (the former being about 6 times that of the latter), the effective mol proportion necessary for catalytic purposes in the reaction is rather small. In general, we have found that as long as the mol proportion and acid value of the alkyd resins employed were held constant the phenolic reaction invariably proceeded at the same rate independent of the type of alkyd resin employed, thus indicating that the alkyd resin acted principally as a catalyst. At the same time it was found that as the type of alkyd resin employed was varied, the properties of the final resin produced were decidedly affected. Thus, working with various types of alkyd resins it was found that various types of phenolic resins could be produced. It has been found, moreover, that the alkyd resin catalyst must be employed within a definite limit range. We have found that the limits .01 to .15 mol of alkyd resin per mol of phenolic resin are satisfactory limits for the acid value limits above described. The use of too small amount of catalyst gives a slow setting resin tending materially to the non-convertible type. On the other hand if too much catalyst is used the reaction tends to be uncontrollable and if a resin is formed it is slow setting and approaches the alkyd resin itself in curing and other characteristics.

*Example 1*

A medium A-stage alkyd resin was prepared by heating 2 mols of glycerine (184 parts by weight) with 3 mols of phthalic anhydride (444 parts by weight).

62.8 parts by weight (.10 mol) of this resin were dissolved in 94 parts (1 mol) of phenol in an open vessel equipped with a stirrer. 60 parts by weight (2 mols) of paraform were then added and the mass heated to between 115 and 125° C. to bring about the phenol-formaldehyde condensation. The heating was continued until the free formaldehyde content had decreased to a value below 5% and until a drop of the resin when added to a small volume of alcohol proved to be temporarily insoluble. The resulting resin was a thick viscous liquid when cold. It was readily poured into the desired molds. When it was desired to color the resin, the dye or pigment was added just prior to the completion of the cooking. Undyed or non-pigmented, the resin after curing for two to five days at 65–85° C. was hard, transparent, and amber colored. Higher temperatures of curing, for example, up to about 150° C. were used in some cases and the curing extended to a period of about ten days depending on the results desired. The alkyd resin content in this case was varied between .02 and .10 mols but this variation did not appreciably alter the properties of the final resin, the principal difference observed being a variation in the required time of cooking and curing.

*Example 2*

The alkyd resin catalyst was prepared in the usual way except that the reaction was stopped in the A-stage on reaching an acid value of approximately 150 to 200. The resin was poured into a shallow pan and broken up in small pieces as required. The formula used in preparing this alkyd resin follows:

Glycerine_____184 parts by weight (2 mols)
Phthalic anhydride_444 parts by weight (3 mols)
Glycol_____21 parts by weight (½ mol)
Adipic acid_____73 parts by weight (½ mol)

The temperature of cooking was 200 to 210° C. and the cure time on a 200° C. hot plate on pouring was approximately 50 seconds.

With this resin, the following formula produced a clear nearly water-white casting resin which cured at 65 to 85° C. over a period of three to six days when poured into glass or brass molds:

Phenol C. P_____940 parts by weight (10 mols)
Paraformaldehyde_420 parts by weight (14 mols)
A-stage alkyd resin_400 parts by weight (0.6 mols)

The alkyd resin was dissolved in the molten phenol and added to the paraformaldehyde which had previously been placed in the bottom of a flask equipped with a stirrer, reflux condenser, and thermometer. The reaction mixture was heated to 120° C. and held there for approximately 60 minutes with constant heat supply. The temperature then gradually dropped until the free formaldehyde content was below 6%, which took approximately a total of 150 minutes for the above size batch. When this condition was reached, the resin was subjected to a vacuum treatment with gentle heating until distillation ceased. This required about 45 minutes at 60 to 70° C. and 10 mm. pressure.

The resulting resin was a nearly water-white fluid which poured nicely into molds at 60–70° C. The cured resin was a pale straw color and was easily extractable from the molds. It was water resistant, oil insoluble, hard, tough (impact strength greater than 1.2 ft. lbs./sq. in.) and extremely resistant to ultra-violet light. Its index of refraction was between 1.63 and 1.65.

Similar resins were prepared varying the alkyd resin catalyst between the limits 0.02 and 0.10 mols. Also the phenol-formaldehyde ratio was varied from 1:2.5 to 1:1.1.

Other phenolic derivatives such as the cresols, etc., and aldehydes, such as furfural, may be employed either by themselves or as part of the reaction mass but in general these derivatives yield darker resins.

*Example 3*

Using the procedure given under Example 2 a very flexible alkyd resin of the following formula was used as the catalyst:

| | Parts by weight |
|---|---|
| Glycerine | 18.4 |
| Phthalic anhydride | 44.4 |
| Glycol | 49.6 |
| Succinic acid | 94.4 |

With this resin and the formula given below, a light amber colored, rather fluid resin resulted. On casting this resin and curing, a pale yellow flexible resin resulted:

Phenol_____94 parts by weight (1 mol)
Paraform_____60 parts by weight (2 mols)
Flexible alkyd resin_52 parts by weight (.025 mol)

The flexibility of the casting resin can be varied according to the alkyd resin catalyst employed. Using flexible alkyd resins as catalysts, flexible casting resins result. Thus, using an alkyd resin made from 1 mol glyceryl phthalate-1 mol glycol succinate, a rather firm resin resulted; using 1 mol glyceryl phthalate-2 mols glycol succinate, a medium flexible resin resulted; while using a ratio of 1 mol to 8 mols, as above, a very flexible resin resulted.

Example 4

Employing the procedure and formula given in Example 2, a resin was made using A-stage glyceryl succinate as the alkyd resin catalyst. This resin was very light colored, clear, and tough when cast and cured. Similar results were obtained with glyceryl adipate. Alkyd resins made entirely from polybasic aliphatic acids rather than polybasic aromatic acids can therefore be used.

Example 5

| | Parts by weight |
|---|---|
| C. P. Phenol | 10.1 |
| Paraformaldehyde | 5.6 |
| Flexible alkyd resin | 4 |

Acid value=180–200.

The flexible alkyd resin employed has the following formula:

| | Parts by weight |
|---|---|
| Glycerine | 184 |
| Phthalic anhydride | 444 |
| Adipic acid | 219 |
| Glycol | 93 |

The alkyd resin catalyst is stirred into the molten phenol with the application of heat, care being taken that the temperature does not exceed 90° C. When complete miscibility has been obtained the aldehyde is added and heating and stirring continued under a reflux condenser which prevents the loss of formaldehyde. This operation is continued until a temperature of 120° C. is reached. The temperature is kept constant for approximately one hour when the temperature will be observed to drop slowly. After an additional reaction of 1½ hours, the temperature will have dropped to about 109° C. At this point, provided the free formaldehyde content is 9 to 10% or less the reaction mass is further cooked exposed to the atmosphere, and with stirring, at a temperature of not over 100° C. When the formaldehyde content has been further reduced to 5% or less the reaction is concluded and the resin cast at temperatures of 65° to 100° C. The resulting product is very tough, light colored, easily machinable and water and light resistant.

Our invention has enabled us to produce casting resins which are color fast, tough and are speedily cured. These resins are moreover of high mechanical strength. Transparent as well as translucent and opaque effects have been obtained with ease. The resins invariable are very fluid right up to the gel point allowing almost any shape to be cast. Furthermore, the resins invariably convert very rapidly and at moderate temperatures reaching their ultimate cure stage in as short a cure time as 24 hours at 90° C., although we have found 48 to 60 hours at 85° C. preferable in most cases. Successful castings have been made in glass, brass, lead, tin, and Babbitt molds. In several cases, cores were used with success.

Most of the resins of our invention are moderately fluid even at room temperature, thus allowing their use as impregnating agents without solvents. For example, we have taken paper insulated layer wound coils and after making a suitable lead mold we have impregnated the coils by placing the coils in the molds and adding the fluid resin directly thereto and after curing and removing from the mold we have obtained a coil with a tough, accurate protective coating. The resulting coil was equivalent to a molded coil.

Several articles of manufacture have been produced from the resins of our invention. As a partial list, are the following: Rods, sheets, tubes, radio knobs, umbrella handles, pen holders, cigar and cigarette holders, door knobs, ink wells and lenses.

The resin can also be used in the form of a varnish or a low temperature baking lacquer by dissolving it in such solvents as acetone, acetone-alcohol, alcohol-benzol. Hard, tough, light-resistant, water-proof films result.

What we claim as new and desire to secure by Letters Patent of the United States, is:—

1. The method which comprises reacting a phenol and an excess of paraformaldehyde at a temperature not exceeding 130° C. in the presence of a relatively small proportion of soluble alkyd resin catalyst of acid number between approximately 140 and 210 until the free formaldehyde content is less than about 6% and a liquid resinous product results, and casting and curing the product so produced at a temperature not less than 65° C. and substantially not in excess of 125° C.

2. The method which comprises reacting a phenol and an excess of paraformaldehyde at a temperature not exceeding 130° C. in the presence of a relatively small proportion of a soluble acidic catalyst of acid number between approximately 140 and 210 which catalyst is the product of reaction of an organic polybasic aromatic acid, an alcohol having at least three hydroxyl groups, a dibasic aliphatic acid and a dihydric alcohol, carrying out the reaction until the free formaldehyde content is less than about 6% and a liquid resinous product results, and casting and curing the product so produced at a temperature not less than 65° C. and substantially not in excess of 125° C.

3. A casting resin adapted to be cured at a temperature not less than 65° C. and substantially not in excess of 125° C. which is produced by reacting a phenol and an excess of paraformaldehyde at a temperature not exceeding 130° C. in the presence of a relatively small proportion of soluble alkyd resin catalyst of acid number between approximately 140 and 210 until the free formaldehyde content is less than about 6% and a liquid resinous product results.

4. A cured cast resin produced by curing at a temperature not less than 65° C. and substantially not in excess of 125° C. a casting resin produced by reacting at a temperature not exceeding 130° C., a phenol, an excess of paraformaldehyde and a relatively small proportion of soluble alkyd resin having an acid number between approximately 140 and 210, the reaction being carried out until the free formaldehyde content is less than about 6% and a liquid resinous product results, said cured cast resin being oil insoluble, water resistant, hard, tough and resistant to ultra-violet light.

5. A casting resin adapted to be cured at a temperature not less than 65° C. and substantially not in excess of 125° C. produced by reacting a phenol and an excess of paraformaldehyde at a temperature not exceeding 130° C. in the presence of a soluble acidic catalyst of acid number between approximately 140 and 210 which catalyst is the product of reaction of an organic polybasic aromatic acid, an alcohol having at least three hydroxyl groups, a dibasic aliphatic acid and a dihydric alcohol, the reaction being carried out until the free formaldehyde content is less than about 6% and a liquid resinous product results.

6. A casting resin adapted to be cured at a temperature not less than 65° C. and substantially not in excess of 125° C. which is produced by reacting at a temperature not exceeding 130° C. phenol, an excess of paraformaldehyde, and a soluble acidic catalyst of acid number between approximately 140 and 210 until the free formaldehyde content is less than about 6% and a liquid resinous product results, said acidic catalyst being the product of reaction of glycerine, phthalic anhydride, adipic acid and glycol.

ROY H. KIENLE.
PAUL F. SCHLINGMAN.

CERTIFICATE OF CORRECTION.

Patent No. 2,025,538.                                December 24, 1935.

ROY H. KIENLE, ET AL.

It is hereby certified that error appears in the printed specification of the above numbered patent requiring correction as follows: Page 2, second column, line 11, in the table, for the numeral "21" before "parts" read 21; and that the said Letters Patent should be read with this correction therein that the same may conform to the record of the case in the Patent Office.

Signed and sealed this 18th day February, A. D. 1936.

Leslie Frazer (Seal)                                    Acting Commissioner of Patents.